G. McNEILL.
TIRE BUILDER'S TOOL.
APPLICATION FILED FEB. 10, 1915.

1,177,197.

Patented Mar. 28, 1916.

Witnesses:
Veronica Braun
Frances Boyle

Inventor
GEORGE McNEILL.
By his Attorney
Ernest Hopkinson

UNITED STATES PATENT OFFICE.

GEORGE McNEILL, OF DETROIT, MICHIGAN, ASSIGNOR TO MORGAN & WRIGHT, A CORPORATION OF MICHIGAN.

TIRE-BUILDER'S TOOL.

1,177,197.  Specification of Letters Patent.  Patented Mar. 28, 1916.

Application filed February 10, 1915. Serial No. 7,299.

*To all whom it may concern:*

Be it known that I, GEORGE MCNEILL, a citizen of the United States, and a resident of Detroit, county of Wayne, and State of Michigan, have invented certain new and useful Improvements in Tire-Builders' Tools, of which the following is a full, clear, and exact description.

This invention relates to tools for tire builders, more particularly to tools for use in stitching down fabric in conforming the same to the configuration of a ring core in building a tire.

An object of the present invention is to provide a stitcher having anti-friction balls in the edge for contact with the tire, whereby as the tool is moved thereover the balls rotate freely and thus exert no stretching action on the fabric.

With the above and other objects in view the invention consists in certain novel details of construction and combinations of parts hereinafter fully described and claimed, it being understood that various modifications may be resorted to without departing from the scope or sacrificing any of the advantages of the invention.

Figure 1:
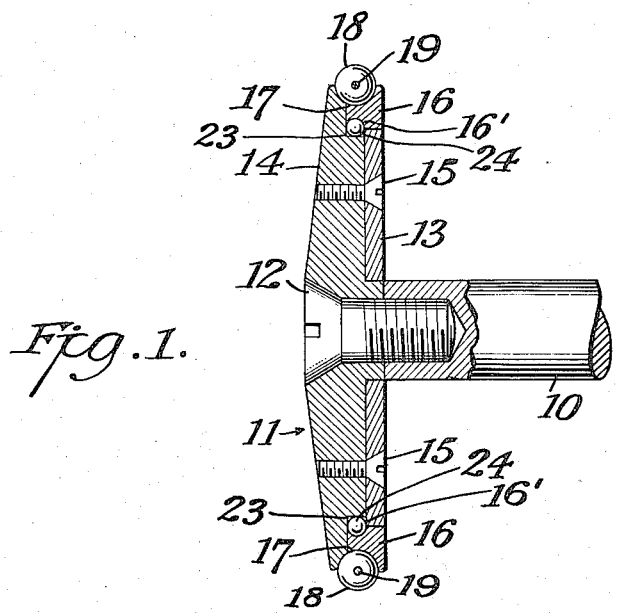
Figure 2:
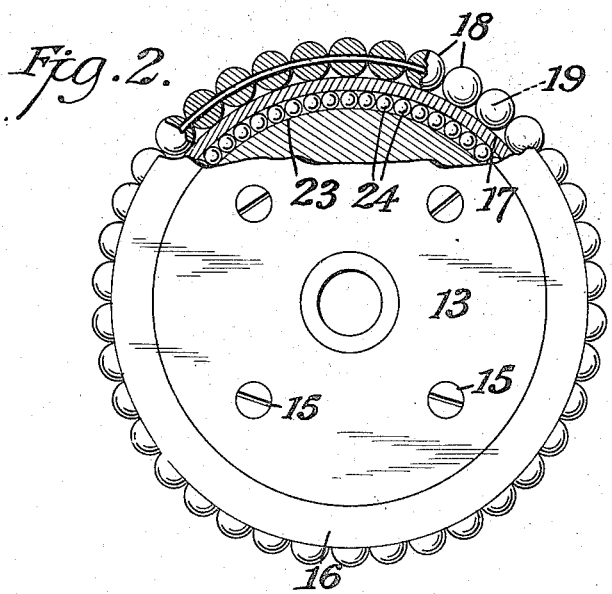
Figure 3:
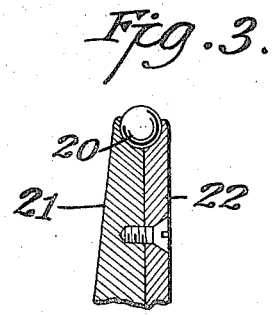

The invention will be readily understood from the following description taken in connection with the accompanying drawing in which:

Figure 1 is a longitudinal sectional view through the tool; Fig. 2 is an elevation of the tool partly in section; Fig. 3 is a fragmentary sectional view showing a modification.

Referring now to the drawing in which like characters of reference designate similar parts, the tool is shown to comprise a handle 10 by means of which the tool may be manipulated and which may be mounted or not as desired on any apparatus, and a support 11, the latter being concentrically secured to the end of the handle by means of a screw 12 which binds the support against rotation upon the handle. The support may be of any desired shape, such as oval or rectangular, but in the present embodiment is shown as a disk.

The support is preferably formed in two parts 13 and 14 removably secured together by screws 15 whereby the parts may be disassembled to permit of the application and removal of anti-friction balls. Mounted to turn on the part 13 of the support is an annulus 16 which co-acts with the other part 14 of the support in forming a ball race 17 for anti-friction balls 18, the latter in one embodiment being threaded upon a wire ring 19, which is itself rotatable in the ball race about the axis of the support, the anti-friction balls being individually turnable transversely upon the ring as an axis. However, it is not to be understood that the invention is limited to this particular construction, since the anti-friction balls, as are shown at 20, may be loosely confined between parts 21 and 22 of a support, the edges of the parts being crimped over the balls to hold them in place and permit of their movement bodily in the ball race thus formed, and also to permit of their rotation universally, that is, each ball may rotate freely on any of its axes. The annulus 16 is formed with a groove 16', and the part 14 of the support is formed with a mating groove 23, these grooves co-acting in forming a ball race for ball bearings 24 which promote the free rotation of the annulus upon the support.

In operation when the tool is moved over the tire, each of the ball bearings generates a corresponding line upon the tire at all points of which the fabric is pressed in close contact with the next underlying layer of fabric, the balls rotating freely as above described, whereby they exert no stretching or distorting effect upon the fabric. Since the ring core upon which the tire is built is power-driven during the operation of stitching the fabric, the above described lines generated by the balls of the tool will merge into a continuous surface as the tire rotates past the tool whereby the layers of fabric are closely united throughout and pressed to conform closely to the configuration of the ring core.

What I claim and desire to protect by Letters Patent is:

1. A tire builder's tool embodying a support, having a ball race in the periphery, and anti-friction balls in said ball race for contact with the tire.

2. A tire builder's tool embodying a support, an annulus rotatably mounted on the support and co-acting therewith in forming a ball race, and anti-friction balls in said ball race for contact with the tire.

3. A tire builder's tool embodying a support, having an annular ball race in the periphery, anti-friction balls and means for retaining said balls rotatably mounted in said ball race.

4. A tire builder's tool embodying a support, an annulus carried concentrically by the support and mounted thereon for rotation about the axis of the support, and co-acting with the support at the edge in forming a ball race, anti-friction balls in said ball race for contact with the tire, and ball bearings confined between said annulus and said support.

5. A tire builder's tool comprising an annular support, and an anti-friction device rotatably mounted on the periphery of the support adapted to contact with the tire.

Signed at Detroit, this 20th day of January, 1915.

GEORGE McNEILL.

Witnesses:
JOHN CARLSON,
J. H. SWIFT.